(12) United States Patent
Mattson, Jr. et al.

(10) Patent No.: US 6,430,741 B1
(45) Date of Patent: Aug. 6, 2002

(54) SYSTEM AND METHOD FOR DATA COVERAGE ANALYSIS OF A COMPUTER PROGRAM

(75) Inventors: James S. Mattson, Jr., Campbell; Richard F. Man, Palo Alto, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/259,072

(22) Filed: Feb. 26, 1999

(51) Int. Cl.[7] .................................................. G06F 9/45
(52) U.S. Cl. ...................... 717/154; 717/158; 717/126
(58) Field of Search ............................ 717/9, 1, 3, 4, 717/151, 100, 120, 124, 154, 158, 126, 127, 130, 131, 128; 709/100; 703/22–26; 711/118; 714/39, 35, 47, 702, 712, 763

(56) References Cited

U.S. PATENT DOCUMENTS

| | | | |
|---|---|---|---|
| 5,274,811 A | * 12/1993 | Borg et al. ..................... | 717/4 |
| 5,335,344 A | * 8/1994 | Hastings ....................... | 714/35 |
| 5,412,799 A | * 5/1995 | Papadopoulos .............. | 703/22 |
| 5,450,586 A | * 9/1995 | Kuzara et al. ................ | 717/124 |
| 5,659,752 A | * 8/1997 | Heisch et al. ................ | 717/158 |
| 5,691,920 A | * 11/1997 | Levine et al. ................ | 702/186 |
| 5,835,702 A | * 11/1998 | Levine et al. ................ | 714/39 |
| 5,857,104 A | * 1/1999 | Natarjan et al. ............. | 717/158 |
| 6,189,072 B1 | * 2/2001 | Levine et al. ................ | 711/118 |

* cited by examiner

*Primary Examiner*—Gregory Morse
*Assistant Examiner*—Hoang-Vu Antony Nguyen-Ba

(57) ABSTRACT

The inventive system and method is directed toward verifying the accuracy of data tables specified by a developer to be used by a program. The system searches through an application program for instructions which access areas of memory declared by the developer as being of interest and executes instrumentation code for these instructions. Input to the program is the source code of a user program and optionally, a data coverage specification prepared by a developer. Instrumentation can be implemented by inserting instrumenting code into the source code prior to compilation using facilities within the compiler itself. Alternatively, the instrumentation code can be added to the executable program code after compilation is complete. Yet a third option involves generating and executing instrumentation during execution of the user program without ever modifying the user program code at any stage. The output of the system is data coverage information indicating the number of times that various elements of the data tables of interest have been accessed during one full run of the user program. The system thereby provides a mechanism for evaluating the integrity of data to be accessed by a program where prior instrumentation systems have concentrated on verifying the validity of program logic flow.

18 Claims, 5 Drawing Sheets

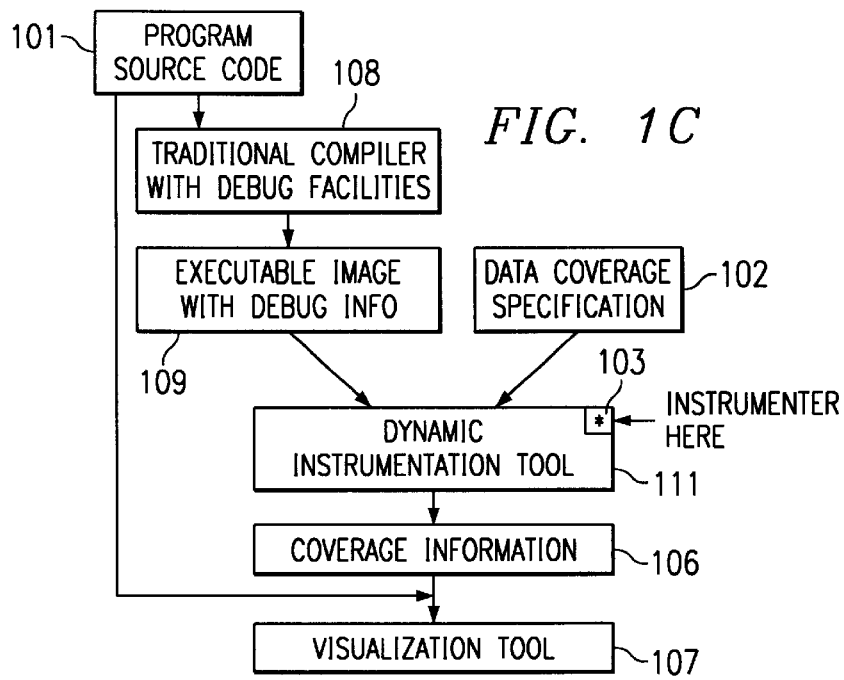
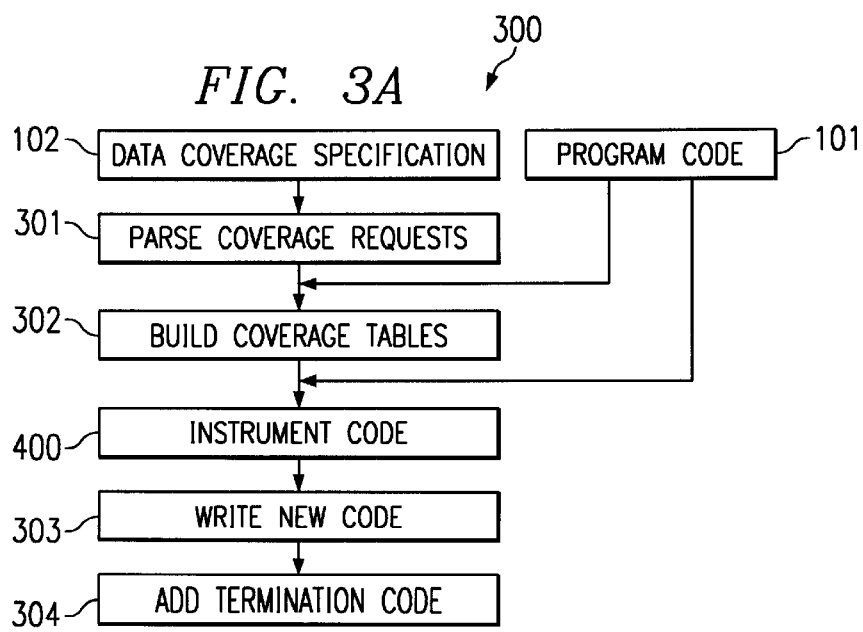

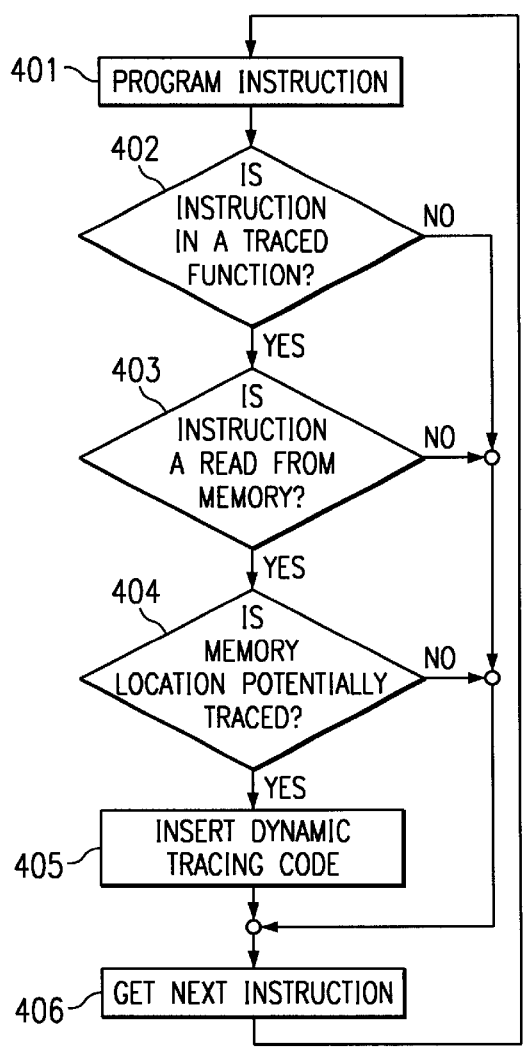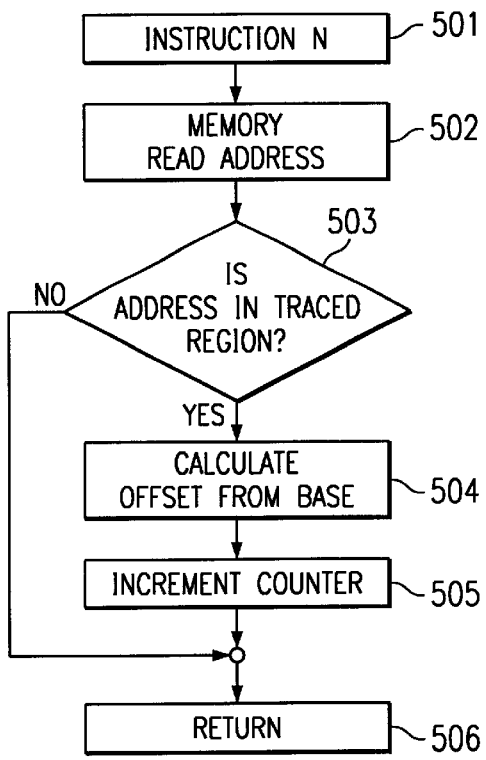

SYSTEM AND METHOD FOR DATA COVERAGE ANALYSIS OF A COMPUTER PROGRAM

TECHNICAL FIELD OF THE INVENTION

This invention is directed to a method and system for providing data coverage analysis of a computer program.

BACKGROUND OF THE INVENTION

Compilers convert a source program that is usually written in a high level language into low level object code, which typically consists of a sequence of machine instructions or assembly language. The constructs in the source program are converted into a sequence of assembly language instructions. To obtain a reasonable level of confidence in the correctness of the program, it is advantageous to test the compiler-generated code on a wide variety of inputs so that each and every block of code is exercised.

There are currently a number of tools available for doing program flow analysis or path coverage analysis of an application program. During program development, these instrumenting tools allow a developer to see which control paths are executed in his program. The tool instruments the code, adding monitoring capabilities so that it can determine which blocks of code get executed, and how often.

After running the application program along with the instrumenting tool, there is usually some kind of visualization facility which color codes sections of code in the application program based upon the frequency of execution of each code section. A product called PURE COVERAGE™ (available from Rational Software Corporation of Lexington, Mass.) provides such a service. It has been observed that code which is tested during the development phase is less likely to contain bugs than code developed without such testing.

A related issue arose in a commonly available processor that included a floating point divide bug where a large data table driving the division algorithm contained some incorrect values. The testing employed at the time failed to detect the errors because there was no exhaustive test of all elements in the data table.

This example exposes a problem in the art. Whereas the path flow analysis may have been straightforward, well tested, and have contained no errors, no comparable analysis was performed on the data tables required for a floating point divide operation. Consequently, an incorrect entry in this table went undetected by whatever instrumenting techniques were applied to that program.

This experience therefore demonstrates a shortcoming of the path flow analysis technique. Even if the logic flow of an application program is thoroughly analyzed, and found to be correct by an instrumenting program, there remains the possibility that the program could malfunction upon execution because there has not been a comprehensive evaluation of the correctness of entries in the data table employed by the application program.

Therefore, there is a need in the art for a method and system for identifying, after execution of a program which accesses data tables, the number of times each element of each data table was accessed.

There is a further need in the art for a method and system for identifying elements in data tables which have not been accessed at all.

SUMMARY OF THE INVENTION

These and other objects, features and technical advantages are achieved by a system and method which generates a data coverage specification which identifies functions of interest and memory locations within a range of interest, and then instruments program statements which satisfy one or more criteria of the data coverage specification.

In order to determine the number of entries in a data table accessed during operation of an application program, the areas in computer memory associated with this data table must be identified. The developer lists functions of interest and memory locations associated with data tables which are of interest to the developer. The resulting package of information is the data coverage specification. The application program and data coverage specification are provided to the data coverage instrumentation tool which actually searches through the program looking for program instructions which access memory locations of interest.

The existence of the data coverage specification permits the instrumentation tool to concentrate on instructions which access selected areas of memory, rather than instrumenting all memory access instructions, thus reducing the workload of the instrumentation program. Alternatively, all code which accesses constant data could be instrumented thereby providing greater simplicity to the instrumenting algorithm, but also incurring the additional processing time of instrumenting a greater total number of instructions.

In a preferred embodiment, the data coverage specification identifies both functions of interest which can be mapped to code regions of interest as well as data tables to be checked which are located in memory areas of interest.

Mapping of function names to code areas of interest requires mapping information connecting the function names to the code areas in memory. Such mapping information is commonly found in executable image files. In an alternative embodiment, if such function to memory location mapping is unavailable, the functions to be instrumented could be identified by explicitly stating the addresses where the functions are found. This latter approach is however, more inconvenient for the developer.

In a preferred embodiment, the mechanism executes a two phase process for keeping track of access or reads from data tables of interest. The first phase involves instrumenting only instructions associated with functions of interest, such instructions being instructions of interest. The mechanism then acts to determine whether the instruction of interest accesses or may access a memory region of interest. If the instruction either does not access memory, or accesses memory which is definitely outside the memory region of interest, no further action is taken. If the instruction of interest either may read from or definitely reads from a memory location of interest, the second phase of the memory access tracking is activated which is preferably the insertion of dynamic tracing code.

Preferably, the dynamic tracing code determines whether the instruction of interest identified in phase one as possibly accessing the memory region of interest in fact accesses this region. If the dynamically traced instruction is ultimately found not to access the memory region of interest, no further action is taken with regard to that instruction. If the dynamically traced instruction does in fact access a memory region of interest, the counter for the data element in the region of interest accessed by the instruction is appropriately incremented. The code added by the instrumentation tool will execute along with the application program in which it is embedded, and create an auxiliary table containing coverage information relating to memory access operations from the regions of interest.

By way of example, if the memory region of interest is a table of 100 data items, then a data coverage table would be created which also contained 100 elements, with each element having a counter initialized to "0" and which corresponds to a data element in the memory region of interest for the purpose of keeping count of the number of times that data element gets accessed during execution. For the purpose of this example, let us assume that the instruction "ADD" is associated with a function of interest. Encountering an "ADD" instruction will trigger further examination of the instruction. Now that the current instruction is known to be an instruction of interest, it remains to determine whether the instruction accesses a memory region of interest. If the instruction does not access a memory region of interest, no further action is taken.

If the instruction does access a memory region of interest, the data element in the region which has been accessed is identified along with its counterpart in the data coverage table. The appropriate element in the data coverage table is then incremented to reflect the read operation performed by the instruction of interest. This and other counters will be similarly incremented as subsequent instructions of interest are found to read from memory regions of interest.

Upon completion of execution, each counter would have a value equal to the total number of times that memory location was accessed. Any counter having a value of 0 after program execution would trigger attention from the developer, since the memory location associated with that counter has not yet been tested. Counter value data is then dumped out to a coverage file after execution of the instrumented program. There is a facility to merge the data coverage files resulting from different runs of the instrumented program.

Next, this coverage information is read from the merged file using a visualization tool which displays the number of times each element in the data table has been accessed. The visualization tool acts to more clearly illustrate the number of times each element in the table has been accessed. One approach to visualization would be to represent different ranges of access in different colors. In a preferred embodiment, Black would be used to indicate a high access level, Pink to indicate a low access level, and Red to indicate unaccessed items.

The above approach will identify for the developer, elements in the data table which have not been accessed by the application program in the course of running the test suite. With this information, the developer may either modify the test suite to ensure that all elements in the table are accessed, or examine the unaccessed elements by hand to ensure that they are correct.

Therefore, it is a technical advantage of the present invention that the number of accesses to each element in data tables of interest during execution of a program is identified.

It is a further technical advantage of the present invention that elements in data tables of interest which have not been accessed at all are identified.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1C depicts a dynamic instrumentor implementation of the inventive system according to a preferred embodiment of the present invention;

FIG. 2 depicts a data coverage specification according to a preferred embodiment of the present invention;

FIG. 3A depicts the process of inserting instrumentation code into an application program using the first two inventive mechanisms of the present invention;

FIG. 4 depicts the program instrumentation procedure for both the instrumenting compiler and static instrumentor according to a preferred embodiment of the present invention;

FIG. 5 depicts the execution of dynamic tracing code for both the instrumenting compiler and static instrumentor according to a preferred embodiment of the present invention;

DESCRIPTION OF THE INVENTION

Figure 1A:
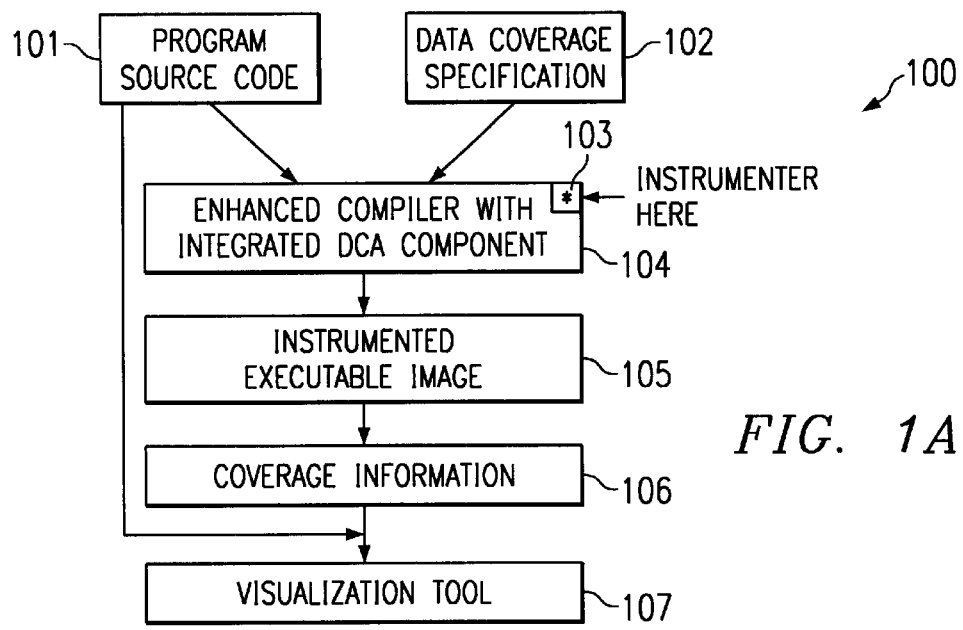
FIG. 1A depicts an instrumenting compiler implementation of the inventive system according to a preferred embodiment of the present invention.

FIG. 1A depicts an implementation of the inventive instrumentor in an instrumenting compiler 100 according to a first embodiment of the present invention. In this first embodiment, the program source code 101, and the data coverage specification 102 are provided to the enhanced compiler having an integrated data coverage analysis component (DCA) or "instrumented compiler" 104. It is noted here that the invention can be practiced without the data coverage specification 102. The specification 102 is included however because it makes the instrumentation process faster and more efficient. Without the data coverage specification 102, all instructions would have to be instrumented, making the instrumented program run much more slowly. The process of screening data access instructions for instrumentation using a data coverage specification is discussed in greater detail in connection with FIG. 2.

With the instrumenting compiler 100, instrumentation is performed within the compiler itself rather than being performed after compilation, or during execution by a dynamic instrumentation tool.

In this embodiment, the inventive instrumentor function 103 is integrated into the enhanced compiler 104 in the form of the data coverage analysis component. The compiler 104 then operates on the source code 101 in combination with the data coverage specification 102, and produces the instrumented executable image file 105. The compiler 104 then preferably generates executable code which performs the instrumentation operations as well as the operations of the original application program.

An advantage of the instrumented compiler embodiment of FIG. 1A is that the compiler can generate machine code for the functions in the source code as well as generate code for checking reads from regions of interest in memory. When appropriate, the instrumented compiler 104 creates a counter to maintain track of access to data elements within a particular region of memory. The executable code associated with program functions and with the instrumentation operations becomes part of the executable image 105. The instrumentation operations are discussed in greater detail in the discussions of FIGS. 4 and 5.

Execution of the instrumented executable image 105 causes the standard application program functions contained in the program source code 101 to execute, and also generates coverage information 106 indicating how many times the various elements of data tables specified in the data coverage specification 102 were accessed during execution. The coverage information 106 is then fed into the visualization tool 107 which correlates the information with the program source code 101, and displays the coverage information 106 in a visually illustrative manner. The visual depiction of the coverage information is discussed in greater detail after the discussion of FIG. 5.

Figure 1B:
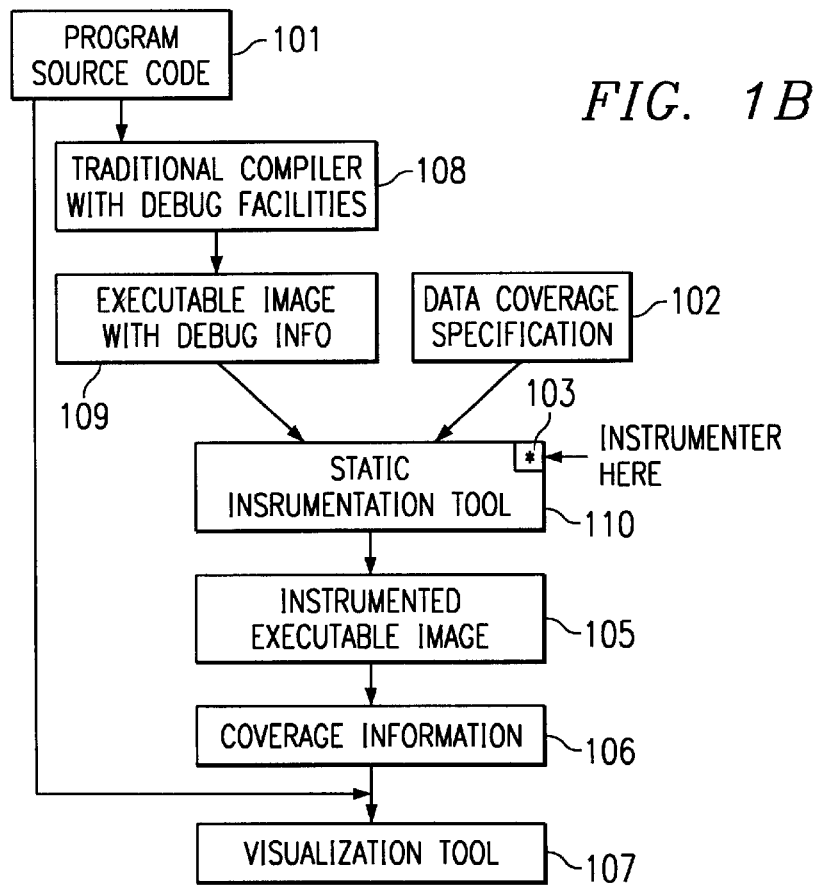
FIG. 1B depicts a static instrumentor implementation of the inventive system according to a preferred embodiment of the present invention.

FIG. 1B depicts a Static Instrumentor implementation of the inventive mechanism according to a second embodiment of the present invention. In this second of the three embodiments, the program source code 101 is fed into a traditional compiler with debug facilities 108. The debug facilities present in the compiler 108 help guide the instrumentation process by providing information about the size of the data tables that are of interest, as well as the size of data structures, or data elements, within each table. Without the debug facilities, the compiler would be limited to having symbol table information which would indicate where a table starts, but would not indicate the size of each element in the table.

The compiler 108 generates an executable image with the incorporated debugging information 109. Then, the executable image 109 and the data coverage specification 102 are fed into the static instrumentation tool 110. In this embodiment, the static instrumentation tool 110 contains the inventive instrumentor 103.

The static instrumentation tool 110 contains code which searches through executable code of executable image 109 instrumenting instructions which are of interest according to the data coverage specification 102, thereby producing the instrumented executable image 105.

From this point forward, this mechanism operates exactly as described for the first mechanism above, producing coverage information 106 to be correlated with the program source code 101, and then fed into the visualization tool 107 which displays the coverage information 106 in a visually illustrative manner.

The second mechanism for instrumenting the application program, depicted in FIG. 1B, is preferred over the first when it is desired to instrument code generated by a number of different compilers, possibly from different compiler vendors. The second mechanism may also be preferable over the first if commercial interests are enhanced by selling the compiler and instrumentation tool as separate products rather than as a unified product.

FIG. 1C depicts the Dynamic Instrumentation implementation of the inventive mechanism according to a third embodiment of the present invention, which is the preferred embodiment. As in the second mechanism (the Static Instrumenter), the program source code 101 is fed into the traditional compiler with debug facilities 108. The debug facilities provide useful information about the data tables of interest. The compiler 108 produces the executable image with debug information 109 as output. Then, the executable image 109 and data coverage specification 102 are fed into the dynamic instrumentation tool 111 which contains the inventive instrumentor 103.

In contrast to the Static Instrumentation Tool 110, the Dynamic Instrumentation Tool 111 does not generate an instrumented executable file. Instead, the dynamic instrumentation tool 111 executes the functions of the executable image, and simultaneously looks for memory accesses to regions of interest as indicated by the data coverage specification 102. Where memory accesses to regions of interest are found in the executable image 109, the dynamic instrumentation tool 111, in addition to executing the original program instructions, executes instrumenting instructions which are incorporated into the dynamic instrumentation tool itself The dynamic instrumentation tool 111 does not add code to the executable image.

Execution of the instrumenting instructions by the dynamic instrumentation tool 111 generates coverage information 106 indicating the number of times each element within a data table identified as being of interest in the data coverage specification 102 has been accessed during one full run of the executable image 109. Once execution of the executable image 109 is finished, the coverage information 106 is complete. The coverage information 106 is then fed to the visualization tool 107 which produces a visually demonstrative display of the coverage information 106.

FIG. 2 depicts a data coverage specification according to a preferred embodiment of the present invention. The Trace <TABLE> directive 201 acts to command that function names contained within "FUNCTION-LIST" be instrumented so as to count the number of times elements within the data table "TABLE" are accessed by program instructions associated with functions contained within function list 203 which is here simply called "FUNCTION-LIST". The function list 203 is then defined, listing the names of the functions which will be instrumented for memory access tracking during execution. For the generic example provided in element 201, only code associated with the functions contained within "FUNCTION-LIST" will be instrumented for the purpose of tracking memory access.

A more specific example is provided where the "trace opcode" directive 204 lists the names of two application functions, "emit_simple" and "emit_imm8." For this directive 204, the completed coverage information will indicate the number of times each element of the data table or array "OPCODE" is accessed when the application is executed. It is noted that for the example given in 204, the mechanism will only instrument, and therefore only track memory access for, code associated with the functions emit_simple and emit_imm8, thereby considerably limiting the computation time needed to accomplish the instrumentation. This result will provide information available to a developer indicating whether all of the machine instructions whose opcodes are encoded in the table called "OPCODE" have been read from the opcode table during the execution of the application.

FIG. 2 illustrates one possible embodiment of a data coverage specification for screening instructions for memory access instrumentation. The object of such screening is to reduce the required computational burden of the instrumentation while still providing valuable memory access information. As an alternative to identifying specific functions to be instrumented for memory access, the program instructions could be identified by leaving codes in the program, identifiable to the compiler, which would flag selected instructions for instrumentation.

In an alternative embodiment, the mechanism would identify data tables of interest having certain ranges of memory locations, and count memory accesses to the selected ranges of memory locations by instrumenting all program instructions containing accesses to memory locations within the range of the identified data tables (memory regions of interest. This approach employs a memory location centered approach, and is more computationally expensive than the data coverage specification embodiment illustrated in FIG. 2 since the mechanism would have to check memory access activity by all instructions capable of accessing a memory region of interest instead of checking such access only for a restricted set of instructions limited by criteria in the data coverage specification.

It is noted that the data coverage specification could be considerably more complex, and more or less restrictive, than the embodiments discussed above, or it could be omitted entirely. The data coverage specification is included to reduce the required amount of instrumentation. In the absence of a data coverage specification, the mechanism would check every line of code in a program for memory access, and keep count of all the accesses to the memory locations encountered during execution of the application program. The programmer could subsequently limit scrutiny of the data coverage information output by the program to the memory regions of interest.

FIG. 3A depicts the process of inserting instrumentation code into an application program using the embodiments depicted in FIGS. 1A and 1B, and previously discussed in this specification in connection with those FIGS.

At step 301, the instrumentor takes as input the program code 101 and data coverage specification 102, and parses the coverage request. Operating on the example of FIG. 2, the parser would identify two code regions of code of interest, the functions "emit_simple" and "emmit_imm8", and one memory region of interest (or data region of interest), the table labeled "opcode".

At step 302, the instrumentor 300 builds coverage tables to be included in the instrumentation code. By way of example, if the data table named "Opcode" had 100 elements, the instrumentor would build a coverage table, or data coverage table, corresponding to the Opcode table, also containing 100 elements whose values are initialized to zero.

At step 400, instrumentation code is generated. The instrumentor searches for code in regions associated with functions "emit_simple" and "emit_imm8", and adds instrumentation to lines of code in these regions which access memory. The process of instrumenting 400 is described in detail in FIG. 4.

At step 303, instrumentation code is added to the original user code, and data coverage tables are created to store information relating to data coverage.

At step 304, termination code is added to the program. The termination code writes the coverage information to a file for later examination.

Figure 3B:
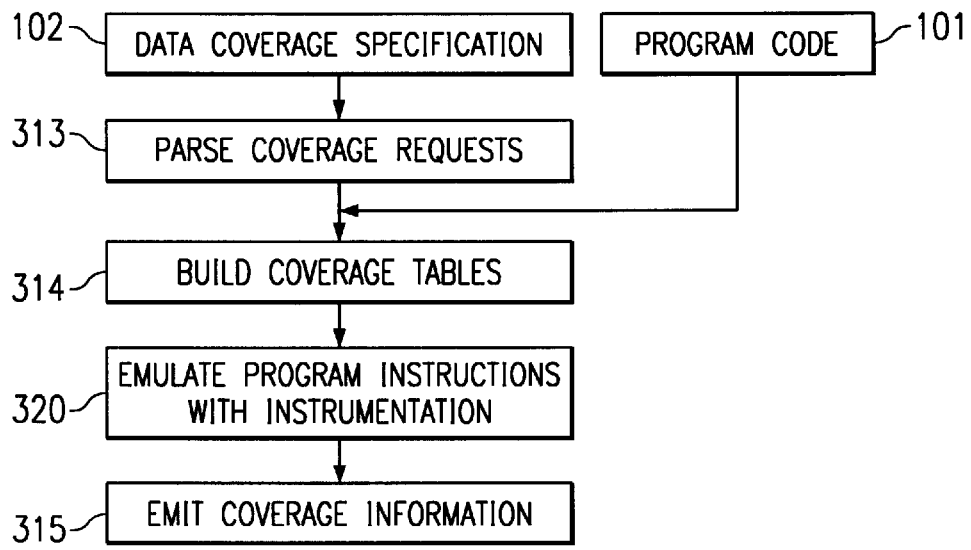
FIG. 3B depicts the process on inserting instrumentation code into an application program using the third inventive mechanism of the present invention.

FIG. 3B depicts the process of inserting instrumentation code into an application program employing a dynamic instrumentor as depicted in FIG. 1C and discussed in connection therewith.

At step 313, the dynamic instrumentor takes as input the program code 101 and data coverage specification 102, and parses the coverage request. Operating on the example of FIG. 2, the parser would identify two code regions of interest, the functions "emit_simple" and "emit_imm8", and one memory region of interest (or data region of interest), the table labeled "opcode".

At step 314, the dynamic instrumentor builds coverage tables to be included in the instrumentation code. By way of example, if the data table named "Opcode" had 100 elements, the instrumentor would build a coverage table, or data coverage table, corresponding to the Opcode table, also containing 100 elements whose values are initialized to zero. The individual elements of the data coverage table will be used to count the number of memory accesses to the corresponding elements of the data table to which access is being tracked.

At step 320, the dynamic instrumentor emulates the original program instructions along with instrumentation code. The process of emulation 320 is described in greater detail in FIG. 3C. Finally, at step 315, the dynamic instrumentor emits coverage information, thereby filling out the data coverage tables.

Figure 3C:
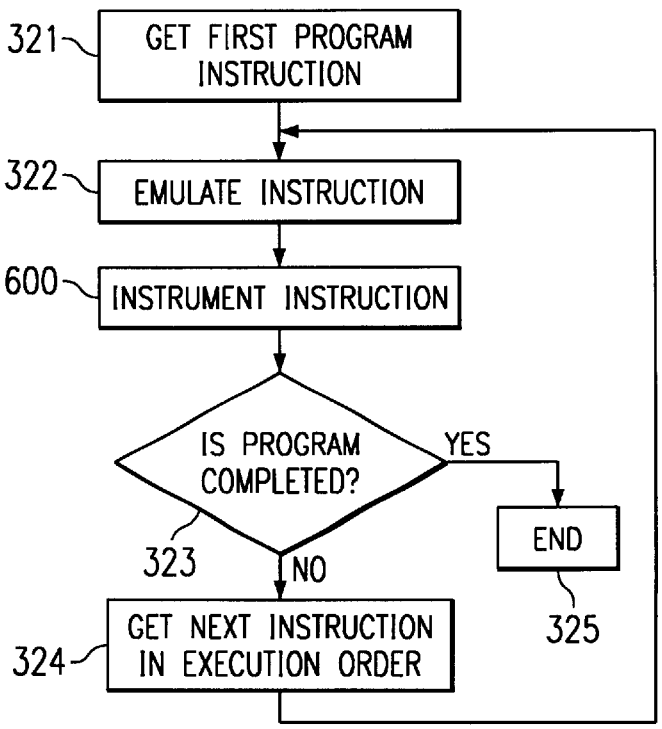
FIG. 3C depicts the emulation of program instructions using instrumentation according to the third inventive mechanism of the present invention.

FIG. 3C depicts the emulation of program instructions using instrumentation according to the third embodiment (dynamic instrumentation) of the present invention 320. At step 321, the inventive mechanism retrieves the first program instruction. At step 322, the mechanism emulates the instruction.

Figure 6:
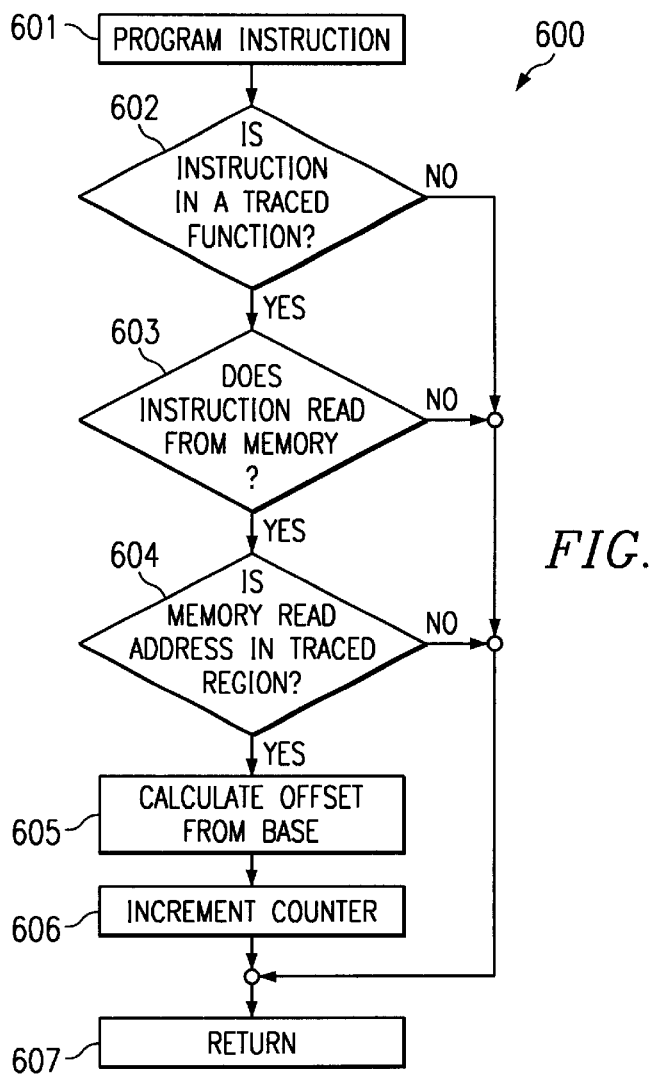
FIG. 6 depicts the instrumentation procedure for the dynamic instrumentor.

At step 600, the mechanism instruments the instruction according to the procedure shown in detail in FIG. 6.

At decision block 323, the mechanism determines whether the program is completed. If the program is completed, execution ends at step 325. If execution is not completed, the mechanism gets the next instruction in the order of execution of the program in step 324.

The inventive mechanism comprises a data coverage analyzer for determining the extent of access to memory regions of interest. The steps described below and depicted in FIGS. 4 and 5 carry out the operations of the data coverage analyzer and its sub-components for the embodiments depicted in FIGS. 1A AND 1B. FIG. 6 describes the instrumentation process for the embodiment depicted in FIG. 1C, that of dynamic instrumentation. The data coverage analyzer comprises a memory region analyzer for identifying which program instructions conduct read operations from memory regions of interest, and a data access recorder for maintaining track of read operations from specific data elements within the memory regions of interest.

The data access recorder can include a data access analyzer for instrumenting program instructions which access memory locations of interest. The data access recorder may also comprise a function list specification for identifying functions of interest within the computer program, and a data coverage optimizer for ensuring that only instructions associated with said functions of interest specified or listed in the data coverage specification are instrumented to check for access to memory locations of interest. Instrumenting such a restricted set of instructions reduces the total computational burden placed upon the instrumenting program. The function list specification is a subset of the data coverage specification and identifies the instructions associated with functions of interest.

The inventive system comprises a coverage instruction locator which identifies instructions which are both associated with functions specified in the data coverage specification, and access data in the memory region of interest. A data coverage reporter is available for counting the number of times each data element in the memory region of interest is accessed by the instrumented instructions.

The data coverage reporters may include data coverage tables having elements which correspond to data elements in the memory regions of interest, wherein each element in the data coverage table serves as a counter. The data coverage reporter may further include a data element resetter for initializing the counters to zero after execution of a program has concluded. Data element adjustors are available for incrementing counters when their associated data elements are accessed by an instrumented program instruction.

FIG. 4 depicts the program instrumentation procedure 400 for both the instrumenting compiler and static instrumentor according to a preferred embodiment of the present invention. This procedure analyzes each instruction of the program and decides where to insert instrumentation code.

At step 401, the procedure 400 retrieves a program instruction from the user program. At step 402, the procedure 400 determines whether the instruction is in a traced function as specified in the data coverage specification 102. If the instruction is not in a traced function, execution continues at step 406 which retrieves the next user program instruction.

If the instruction is in a traced function, execution continues at step 403 which determines whether the program instruction 401 accesses memory. If there is no memory access in the instruction, the procedure 400 retrieves the next instruction in step 406. If the program instruction 401 does access memory, execution continues at step 404.

At step 404, the procedure 400 determines whether the memory location accessed by program instruction 401 is potentially traced according to the data coverage specification 102. Here, "potentially traced" means potentially read from a memory region of interest. If the memory location is not potentially traced, the procedure 400 retrieves the next instruction at step 405. If the memory location is potentially traced, execution continues at step 405. A memory location is potentially traced if it cannot be ascertained with certainty that the read from memory detected in step 403 is outside the memory region of interest according to the data coverage specification. Within the data coverage specification, a memory region specification indicates which areas of memory are of interest and to which access will be monitored.

At step 405, the procedure 400 inserts dynamic tracing code. At this stage, the dynamic tracing code is inserted but not executed because information necessary for executing the tracing code will not be available until run-time. The dynamic tracing code is described in greater detail in connection with FIG. 5.

At step 406, the next instruction in program execution order is acquired.

FIG. 5 depicts the execution of dynamic tracing code 500 for both the instrumenting compiler and static instrumentor. Instruction 501 has already been screened for various criteria in the program instrumentation procedure 400. FIG. 5 depicts the run-time execution of the tracing code inserted in step 405.

At step 502, the instrumentation code reads the memory address accessed by the instruction 501. At step 503, the instrumentation code determines the whether memory address read in step 502 is in the traced region (memory region of interest) or not. If the address is outside the traced region, the instrumentation code for the current instruction terminates, and execution proceeds to the next instruction in program execution order.

If the address is in the traced region, step 504 determines the offset of this memory location from the base of the data table in memory as defined by the data coverage specification 102. The offset number determined in step 504 divided by the size of each data item determines the index of the counter (created in step 302) to be incremented in step 505. At step 505, the instrumentation code increments the counter identified in step 504. Next, at step 506, execution proceeds to the next instruction in program execution order.

Upon completion of execution, each counter would have a value equal to the total number of times its corresponding data element was accessed, or read from, during program execution. Any counter having a value of 0, thereby indicating a null access condition, after program execution would trigger attention from the developer since the memory location associated with that counter has not yet been tested. The null access tracker would act to report data elements in the memory region of interest which have not been accessed at all. Counter value data is then dumped out to a coverage file after execution of the instrumented program. There is a facility for merging the data coverage files resulting from different runs of the instrumented program.

The following discussion applies to the embodiments depicted in FIGS. 1A, 1B, and 1C. The coverage information 106 is read from the merged file using a visualization tool 107 which displays the number of times each element in the data table has been accessed. The visualization tool acts to more clearly illustrate the number of times each element in the table has been accessed. One approach to visualization would be to represent different ranges of access in different colors. In a preferred embodiment, Black would be used to indicate a high access level, Pink to indicate a low access level, and Red to indicate unaccessed items.

Alternatively, a wide range of different colors could be used to indicate the various access levels. Although three levels of data access are discussed in connection with the preferred embodiment, any number of data access levels could be employed without departing from the scope of the present invention.

The above approach will identify for the developer, elements in the data table which have not been accessed by the application program in the course of running the test suite. With this information, the developer may either modify the test suite to ensure that all elements in the table are accessed, or examine the unaccessed elements by hand to ensure that they are correct.

FIG. 6 depicts the instrumentation procedure 600 for the dynamic instrumentor. At step 601 the next instruction in the execution order is retrieved for instrumentation.

In the cases of the instrumenting compiler embodiment which is discussed in connection with FIG. 1A, and the static instrumentor embodiment discussed in connection with FIG. 1B, the instrumentation process is conducted in two separate phases: a static portion performed prior to execution, depicted in FIG. 4, discussed in connection therewith, and a run-time portion, depicted in FIG. 5, and discussed in connection therewith.

These two separate phases exist for the static approaches (the instrumenting compiler and the static instrumenter) because a first instrumentation step is performed prior to execution of the code at which time certain information is not yet available, such as the precise element of a table to be accessed by an instruction. Later, during execution of the code, with the all the required information available, the dynamic tracing code insertion procedure (depicted in FIG. 5) is executed. Thus, FIG. 4 depicts the pre-execution, static portion of the instrumenter, and FIG. 5 depicts the run-time, dynamic portion of the instrumenter.

For the dynamic instrumentor depicted in FIG. 1C and discussed in connection therewith, the entire instrumentation procedure occurs at run-time thereby merging the functionality of FIGS. 4 and 5. Some operations performed for the static instrumentation approaches in FIGS. 4 and 5 end up being condensed in the instrumentation procedure employed for the dynamic instrumenter embodiment. The resulting dynamic instrumentation procedure is depicted in FIG. 6, and discussed in the following.

At decision block 602, the instrumentation code determines whether the instruction is in a traced function. If the instruction is not in a traced function, execution resumes at step 607. If the instruction is in a traced function, execution proceeds at decision block 603.

At decision block 603, the instrumentation code determines whether the instruction conducts a read from memory. If there is no read from memory, execution resumes at step 607. If there is a read from memory, execution proceeds with decision block 604.

At decision block 604, the instrumentation code determines whether the read address is in a traced region or not. The traced region corresponds to the memory region of interest defined in the data coverage specification 102. If the read address is not in a traced region, execution resumes at step 607. If the read address is in a traced region, execution proceeds at step 605.

If the address is in the traced region, step 605 determines the offset of this memory location from the base of the data table in memory as defined by the data coverage specification 102. The offset number determined in step 605 divided by the size of each data item determines the index of the counter (created in step 314) to be incremented in step 606. At step 606, the instrumentation code increments the counter identified in step 605. Next, at step 607, execution proceeds to the next instruction in program execution order.

Figure 7:
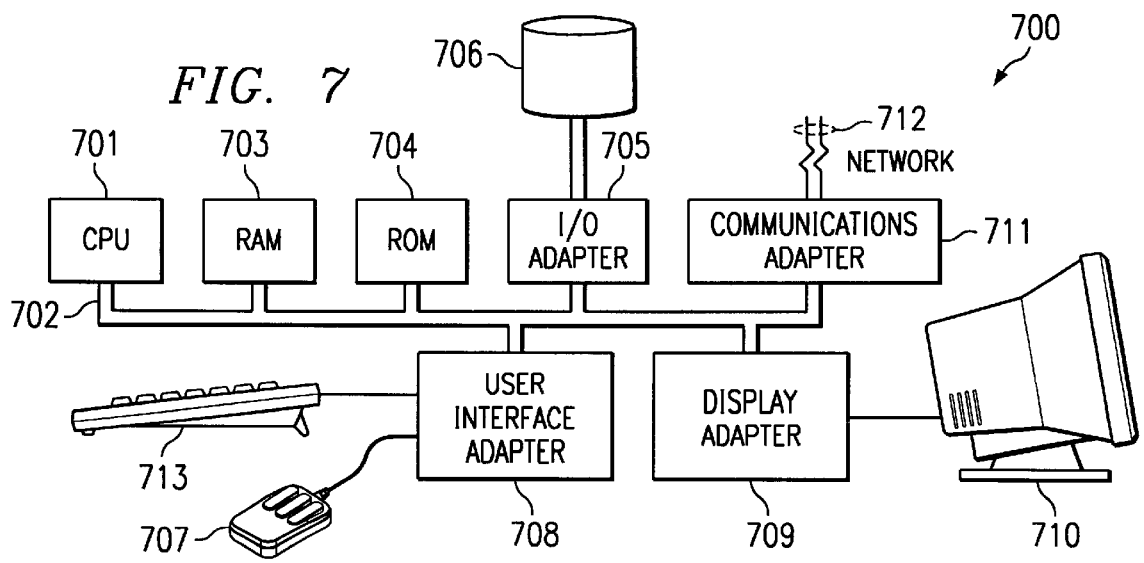
FIG. 7 depicts a computer system adapted to use the present invention.

FIG. 7 depicts a computer system 700 adapted to use the present invention. Central processing unit (CPU) 701 is coupled to bus 702. In addition, bus 702 is coupled to random access memory (RAM) 703, read only memory (ROM) 704, input/output (I/O) adapter 705, communications adapter 711, user interface adapter 708, and display adapter 709.

RAM 703 and ROM 704 hold user and system data and programs as is well known in the art. I/O adapter 705 connects storage devices, such as hard drive 706 or CD ROM (not shown), to the computer system. Communications adaptor 711 couples the computer system to a local, wide-area, or Internet network 712. User interface adapter 708 couples user input devices, such as keyboard 713 and pointing device 707, to the computer system 700. Finally, display adapter 709 is driven by CPU 701 to control the display on display device 710. CPU 701 may be any general purpose CPU, such as a HP PA-8200. However, the present invention is not restricted by the architecture of CPU 701 as long as CPU 701 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A method for analyzing data coverage of a computer program, the method comprising the steps of:
    identifying a region of interest in computer memory, said region of interest being a memory region of interest and having a plurality of data elements; and
    determining an extent of access to said memory region of interest by said computer program, thereby providing data coverage information, wherein the step of determining comprises the step of identifying any data elements within said memory region of interest not accessed during execution.

2. The method of claim 1, wherein the step of determining comprises the steps of:
    identifying read operations by computer program instructions to the data elements within the memory region of interest; and
    maintaining track of reads from data elements during execution of the computer program, thereby indicating which data elements have and have not been read from during execution of the computer program.

3. The method of claim 2, wherein the step of maintaining track of reads from the data elements comprises the step of:
    instrumenting a subset of computer program instructions to check for read operations from data elements in the memory region of interest for computational efficiency.

4. The method of claim 3, wherein the step of instrumenting a subset of computer program instructions further comprises the step of:
    marking instructions to be instrumented with codes recognizable to a compiler, thereby generating marked instructions; and
    instrumenting said marked instructions to check for read operations from data elements in the memory region of interest, thereby obviating a need to instrument instructions which are not marked and providing computational efficiency.

5. The method of claim 3, wherein the step of instrumenting a subset of computer program instructions comprises the steps of:
    identifying functions of interest within the computer program; and
    limiting said step of instrumenting to instructions associated with said functions of interest within said computer program, wherein said instructions associated with said functions of interest are associated instructions.

6. The method of claim 5, further comprising the steps of identifying associated instructions which access data elements within the memory region of interest; and
    counting the number of times each data element in the memory region of interest is accessed by said associated instructions during execution of the computer program.

7. The method of claim 5, wherein the step of instrumenting is performed in an instrumenting compiler.

8. The method of claim 5, wherein the step of instrumenting is performed in a static instrumentor.

9. The method of claim 5, wherein the step of instrumenting is performed in a dynamic instrumentor.

10. The method of claim 2, further comprising the steps of:
    creating data coverage tables having coverage elements corresponding to the data elements in the memory regions of interest, said coverage elements in said data coverage tables being counters;

initializing said counters to zero; and incrementing a counter corresponding to a data element in a memory region of interest by a single count whenever said data element is accessed by the computer program.

11. The method of claim 10, comprising the further steps of:

establishing a final count for each said counter;

producing a data coverage report indicating the final count for each said counter; and color coding said report based on a numerical value of the final count for each said counter, thereby indicating the relative access frequency of the data elements in the memory region of interest in a visually illustrative manner.

12. A system for analyzing data coverage of a computer program, the system comprising:

a memory region specification for identifying a region of interest in computer memory, said region of interest being a memory region of interest and having a plurality of data elements; and a data coverage analyzer for determining an extent of access to said memory region of interest, wherein the data coverage analyzer comprises a memory region analyzer for identifying read operations by computer program instructions to the data elements within the memory region of interest, and a data access recorder for maintaining track of reads from the data elements during execution of the computer program, thereby indicating which data elements have and have not been read from during execution of the computer program.

13. The system of claim 12, wherein the data coverage analyzer comprises:

a null access tracker for identifying any data elements within said memory region of interest not accessed during execution.

14. The system of claim 13, wherein the data access recorder comprises:

a data access analyzer for instrumenting a subset of computer program instructions to check for read operations from data elements in the memory region of interest for computational efficiency.

15. The system of claim 14, wherein the data access recorder further comprises:

a function list specification for identifying functions of interest within the computer program; and a data coverage optimizer for limiting instrumentation to instructions associated with said functions of interest within said computer program, wherein said instructions associated with said functions of interest are associated instructions.

16. The system of claim 15, further comprising:

a coverage instruction locator for identifying associated instructions which access data elements within the memory region of interest; and data coverage reporters for counting the number of times each data element in the memory region of interest is accessed by said associated instructions during execution of the computer program.

17. The system of claim 16, wherein the data coverage reporters comprise:

data coverage tables having coverage elements corresponding to elements in the memory regions of interest, said coverage elements in said data coverage tables being counters;

data element resetters for initializing said counters to zero; and data element adjustors for incrementing a counter corresponding to a data element in a memory region of interest by a single count whenever said data element is accessed by the computer program.

18. A computer program product having a computer readable medium having computer program logic recorded thereon for analyzing data coverage of a computer program, the computer program product comprising:

a memory region specification for identifying a region of interest in computer memory, said region of interest being a memory region of interest and having a plurality of data elements; and a data coverage analyzer for determining an extent of access to said memory region of interest, wherein the data coverage analyzer comprises a null access tracker for identifying any data elements within said memory region of interest not accessed during execution.

* * * * *